US012752587B2

(12) United States Patent
Youn et al.

(10) Patent No.: US 12,752,587 B2
(45) Date of Patent: Oct. 6, 2026

(54) AIR-COOLED BATTERY FOR VEHICLE

(71) Applicants: Hyundai Motor Company, Seoul (KR); Kia Corporation, Seoul (KR)

(72) Inventors: Seon Ung Youn, Sejong-si (KR); Jun Young Lim, Seoul (KR); Kyung Sang Yu, Uijeongbu-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 374 days.

(21) Appl. No.: 18/516,439

(22) Filed: Nov. 21, 2023

(65) Prior Publication Data

US 2025/0042217 A1 Feb. 6, 2025

(30) Foreign Application Priority Data

Aug. 4, 2023 (KR) ........................ 10-2023-0102181

(51) Int. Cl.
*B60H 1/00* (2006.01)
*B60K 1/04* (2019.01)
*B60K 11/06* (2006.01)

(52) U.S. Cl.
CPC ........... *B60H 1/00278* (2013.01); *B60K 1/04* (2013.01); *B60K 11/06* (2013.01); *B60K 2001/0438* (2013.01)

(58) Field of Classification Search
CPC ............................ B60H 1/00278; B60H 1/246
See application file for complete search history.

(56) References Cited

U.S. PATENT DOCUMENTS

| | | | | |
|---|---|---|---|---|
| 4,280,723 | A * | 7/1981 | Moldestad | F16L 37/113 285/376 |
| 8,770,331 | B2 * | 7/2014 | Lim | H01M 10/625 180/68.5 |
| 9,440,509 | B2 * | 9/2016 | Pham | B60L 1/02 |
| 9,725,178 | B2 * | 8/2017 | Wang | G06F 30/15 |
| 11,440,374 | B2 * | 9/2022 | Egashira | B60H 1/00871 |
| 11,703,172 | B2 * | 7/2023 | Sanzone | F16L 37/107 454/69 |
| 2007/0190926 | A1 * | 8/2007 | Lu | H05K 7/20145 454/316 |
| 2011/0165830 | A1 * | 7/2011 | Smith | B60H 1/00278 454/75 |
| 2013/0331022 | A1 * | 12/2013 | Sandman | F24F 13/0272 285/364 |
| 2014/0308559 | A1 * | 10/2014 | Hwang | B60L 1/003 429/120 |
| 2015/0060167 | A1 * | 3/2015 | Janarthanam | B60K 11/08 180/68.1 |
| 2015/0096816 | A1 * | 4/2015 | Pham | B60L 58/27 180/68.2 |

(Continued)

FOREIGN PATENT DOCUMENTS

KR 10-2009- 0017720 2/2009

*Primary Examiner* — Ko-Wei Lin
(74) *Attorney, Agent, or Firm* — Fish & Richardson P.C.

(57) ABSTRACT

An air-cooled battery for a vehicle includes a battery mounted on a floor of the vehicle and cooled by air, and a cooling duct having a first portion that is connected to the battery and extends in a longitudinal direction of the vehicle and a second portion that is branched from the first portion in a width direction of the vehicle and disposed under a seat to discharge the air cooling the battery in multiple directions.

15 Claims, 10 Drawing Sheets

(56) References Cited

U.S. PATENT DOCUMENTS

| | | | | |
|---|---|---|---|---|
| 2015/0183300 | A1* | 7/2015 | Kwon | B60H 1/246 454/155 |
| 2015/0197136 | A1* | 7/2015 | Chen | B60H 1/00285 62/3.61 |
| 2017/0267065 | A1* | 9/2017 | Kim | B60H 1/242 |
| 2018/0056752 | A1* | 3/2018 | Ogawa | B60H 1/00278 |
| 2018/0345759 | A1* | 12/2018 | Okumura | B60K 11/06 |
| 2019/0337352 | A1* | 11/2019 | Sturza | B60H 1/00564 |
| 2020/0148027 | A1* | 5/2020 | Aoki | B60K 1/04 |
| 2020/0313256 | A1* | 10/2020 | Kuronuma | H01M 10/66 |
| 2021/0138872 | A1* | 5/2021 | Göthlin | B60K 11/085 |
| 2022/0288994 | A1* | 9/2022 | Harmon | B60H 1/00285 |
| 2022/0314748 | A1* | 10/2022 | Terai | B60H 1/00678 |

* cited by examiner

AIR-COOLED BATTERY FOR VEHICLE

CROSS REFERENCE TO RELATED APPLICATION

The present application claims priority to Korean Patent Application No. 10-2023-0102181, filed Aug. 4, 2023, the entire contents of which is incorporated herein for all purposes by this reference.

TECHNICAL FIELD

The present disclosure relates to an air-cooled battery for a vehicle for cooling the battery through air.

BACKGROUND

Fuel such as gasoline or diesel was used as a driving source of a vehicle, but recently, consumers' demand for hybrid electric vehicles, which have a battery and a motor built in the vehicle to drive the vehicle with electricity or assist the driving of the vehicle has increased.

For example, a hybrid electric vehicle has an internal combustion engine and a battery built in together, but since the internal combustion engine is a main driving source, the capacity and power of the built-in battery are not large. Considering this point, in some cases, air cooling is adopted in the hybrid electric vehicle as a method for cooling a battery.

In some cases, hybrid electric vehicles may discharge air cooling the battery to an interior in order to prevent outside air, foreign substances, or the like from flowing into the battery. In some cases, passengers may feel uncomfortable due to the heat of the air cooling the battery.

SUMMARY

The present disclosure describes an air-cooled battery for a vehicle, which may minimize discomfort that may be felt by passengers because air cooling the battery is not directly transmitted to the passengers and allow the air cooling the battery to be discharged under a second row seat or discharged under a third row seat.

According to one aspect of the subject matter described in this application, an air-cooled battery for a vehicle includes a battery mounted on a floor of the vehicle and cooled by inhaled air, and a cooling duct of which one end is connected to the battery to extend in a longitudinal direction of the vehicle and the other end is branched in a width direction of the vehicle under a seat to discharge the air cooling the battery in both directions.

An outlet configured to discharge the air cooling the battery to both sides may be provided at the other end of the cooling duct, and the outlet may be disposed to face a seat rail to which the seat is coupled.

A guide grille configured to guide air discharged in a direction toward the seat rail may be provided on the outlet, and the guide grille may have a streamlined shape in which as the guide grille extends toward the seat rail, an upper end there of is close to the seat rail.

A protector extending in a direction toward the cooling duct may be formed at an upper end of the seat rail.

A plurality of holes through which air discharged from the outlet is introduced may be formed in a side surface of the seat rail facing the outlet.

An upper end of the outlet may be disposed to be positioned under an upper end of the seat rail.

An extension duct of which one end is connected to the battery and the other end is connected to the cooling duct may be further included between the battery and the cooling duct.

The one end of the cooling duct may be connected to the other end of the extension duct, and a connector surrounding the one end of the cooling duct may be provided at the one end of the cooling duct.

The other end of the extension duct may be connected to an inner side of the connector provided on the cooling duct.

Each end portion at which the cooling duct and the extension duct are connected may be disposed in a lower space between the seat and the seat.

The outlet may be positioned under a first row seat or a second row seat of the vehicle.

The outlet may be positioned under a second row seat or a third row seat of the vehicle.

The one end of the cooling duct may have an oblique shape in which an upper end protrudes more than a lower end.

In some implementations, where air cooling the battery is blown to a seat rail side to which a seat is coupled under the seat, the air cooling the battery may not be directly transmitted to passengers, and thus it is possible to minimize discomfort that may be felt by the passengers.

For example, a vehicle can include a duct through which the air cooling the battery flows, where the duct can be disposed on a rear seat to allow the air cooling the battery to be discharged to a position, for example, under a second row seat or a third row seat of the vehicle.

DETAILED DESCRIPTION

Figure 1:
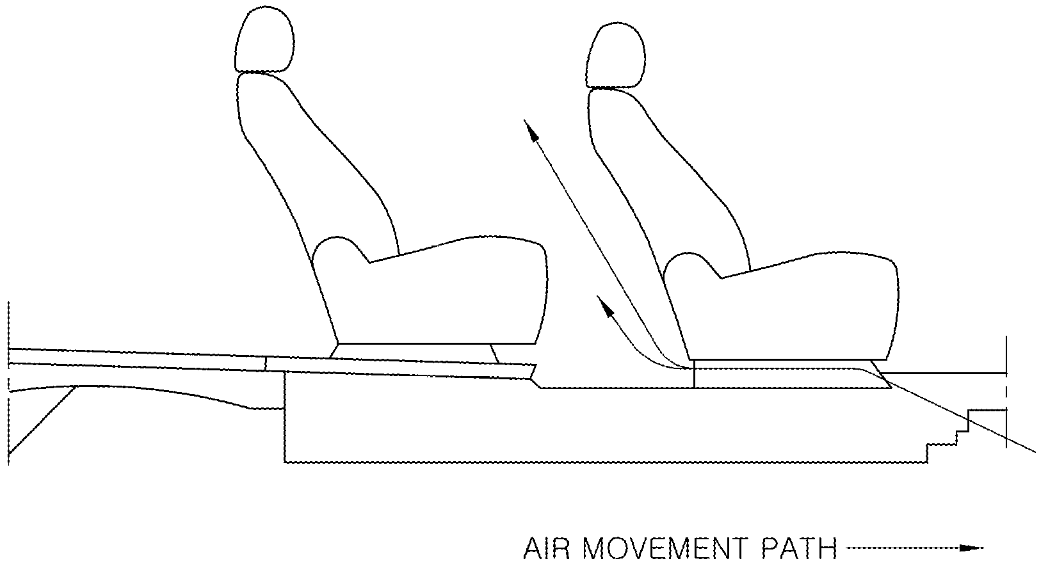
FIG. 1 Prior Art
FIG. 1 is a side view showing an example of an interior of a hybrid electric vehicle in related art.

Hereinafter, one or more implementations will be described in detail with reference to the accompanying drawings, and the same or similar components are denoted by the same reference numerals regardless of the drawing symbols, and overlapping descriptions thereof will be omitted.

Figure 2:
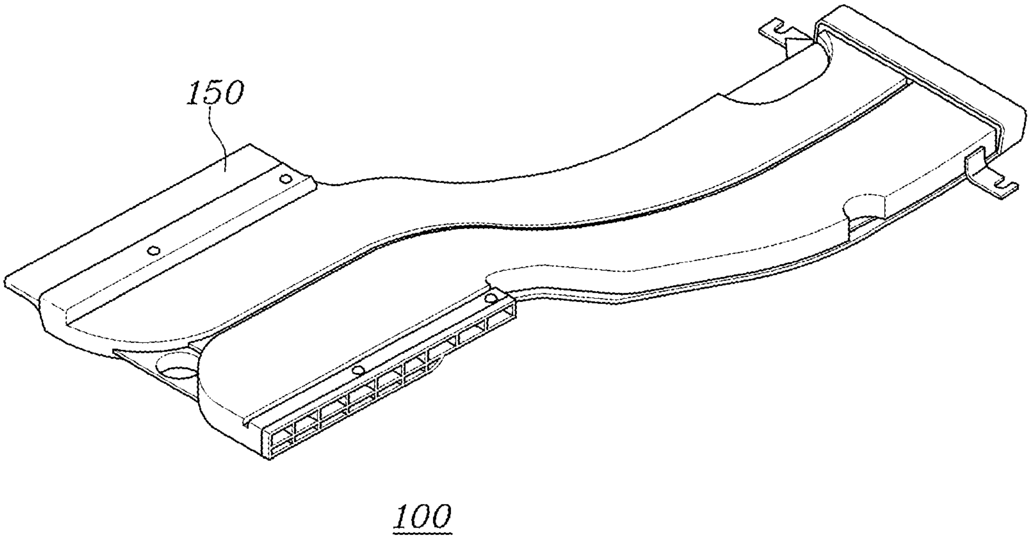
FIG. 2 is a view illustrating an example of a cooling duct of an air-cooled battery for a vehicle.
Figure 3:
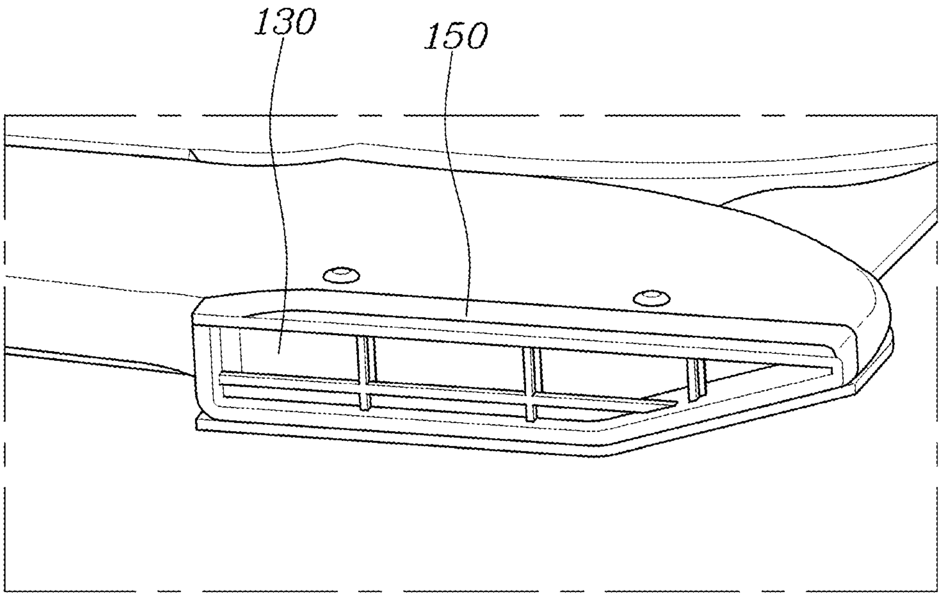
FIG. 3 is an enlarged view showing an example of an end of the cooling duct.
Figure 4:
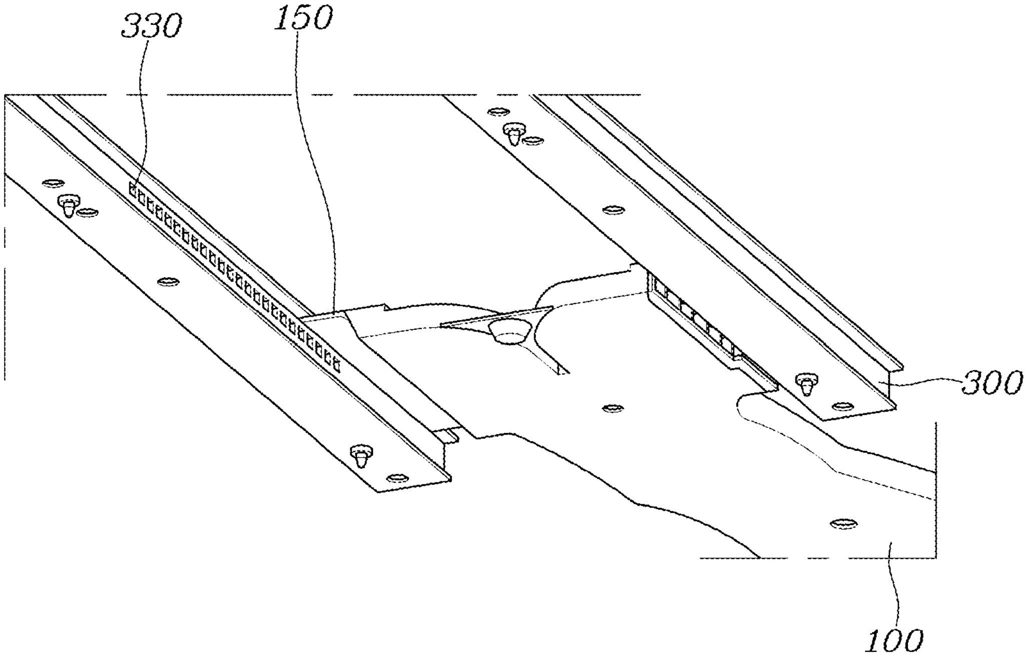
FIG. 4 is a view illustrating an example of a lower surface of the cooling duct.
Figure 5:
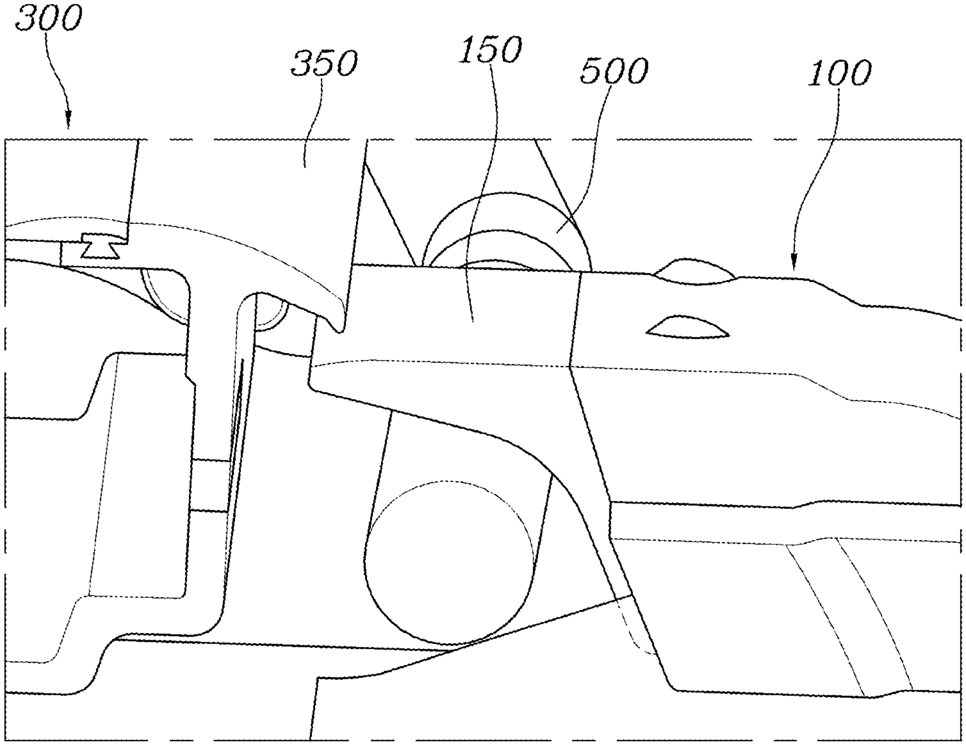
FIG. 5 is an enlarged view illustrating an example of a side portion of a seat rail and a side portion of the cooling duct.
Figure 6:
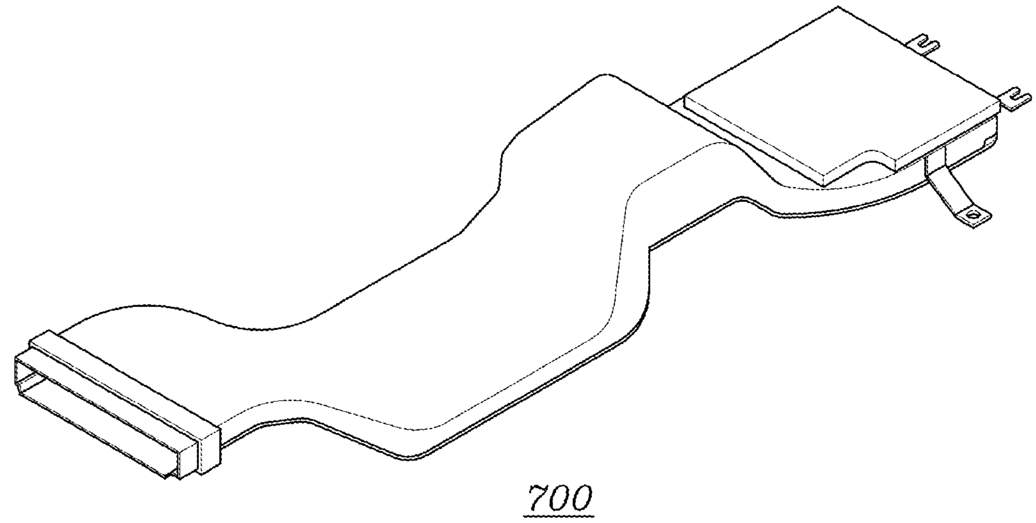
FIG. 6 is a view illustrating an example of an extension duct of the air-cooled battery.
Figure 7:
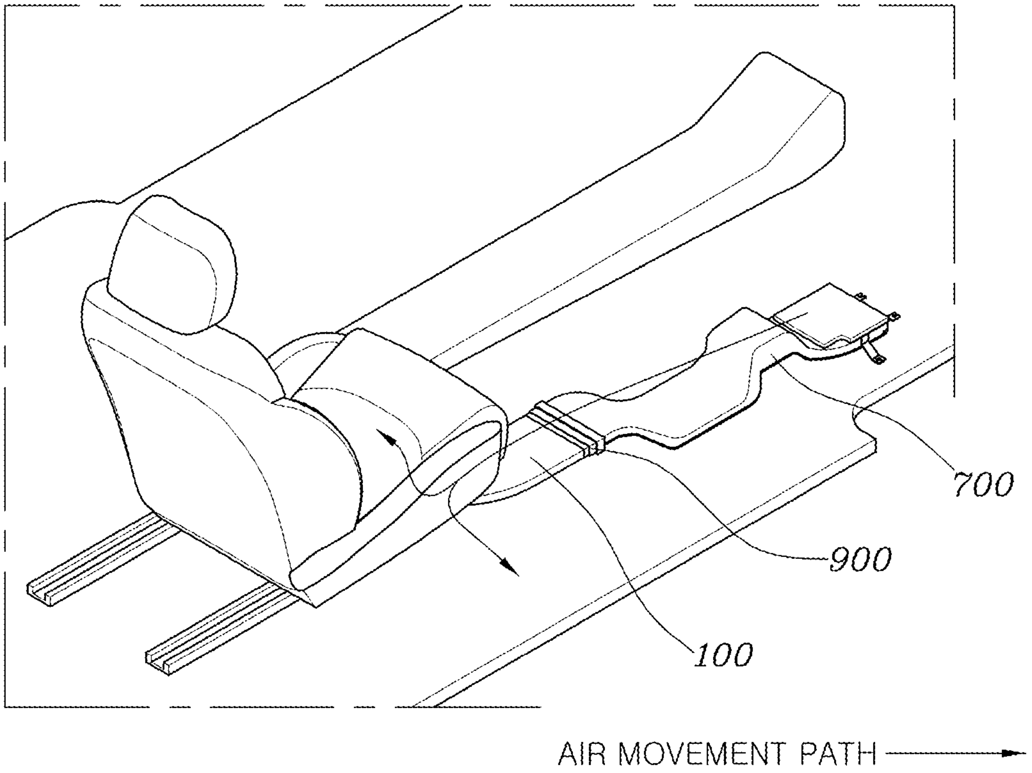
FIG. 7 is a view illustrating an example of a floor of a vehicle to which the air-cooled battery including the extension duct is applied.
Figure 8:
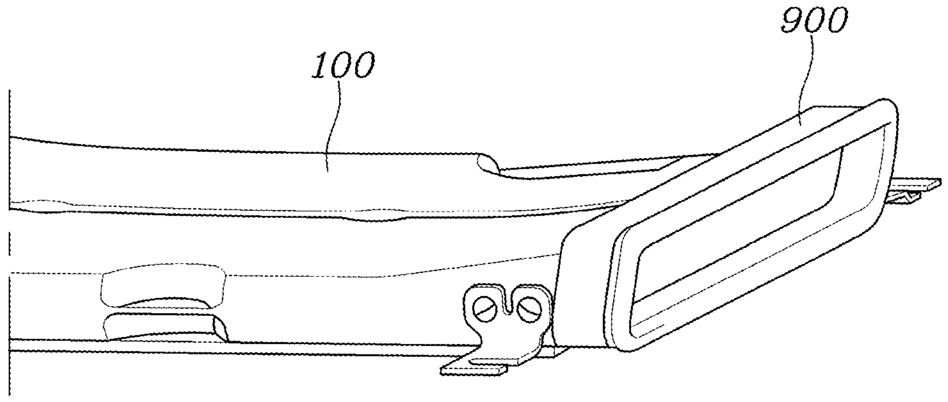
FIG. 8 is a view illustrating an example of one end of the cooling duct on which a connector is provided.
Figure 9:
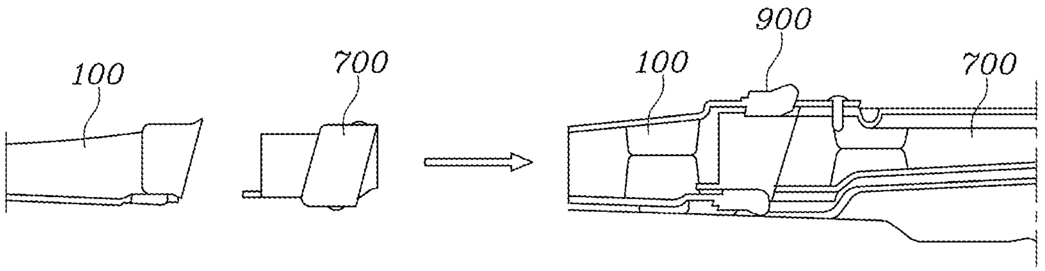
FIG. 9 is a view illustrating an example of a connection between the cooling duct and the extension duct.
Figure 10:
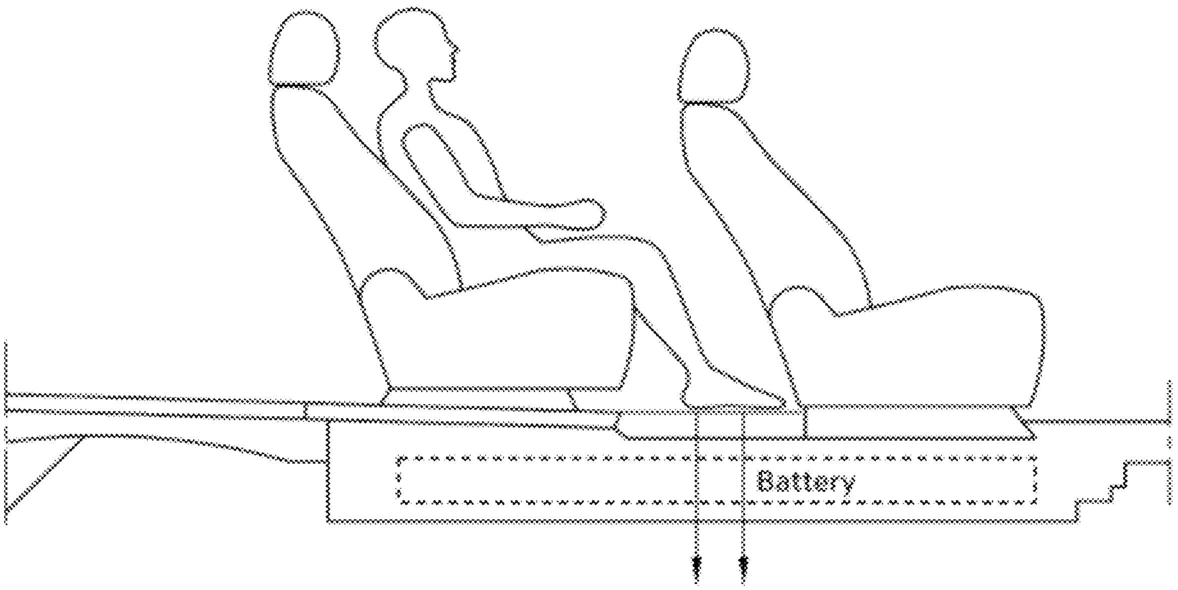
FIG. 10 is a side view showing an example of an interior of a vehicle to which the air-cooled battery is applied.

FIG. 1 is a side view of an interior of a hybrid electric vehicle in related art, FIG. 2 is a view illustrating a cooling duct of an air-cooled battery for a vehicle, FIG. 3 is an enlarged view of the other end of the cooling duct, FIG. 4 is a view illustrating a lower surface of the cooling duct of the air-cooled battery for a vehicle, FIG. 5 is an enlarged view illustrating a side portion of a seat rail and a side portion of the cooling duct, FIG. 6 is a view illustrating an extension duct of the air-cooled battery for a vehicle, FIG. 7 is a view illustrating a floor of a vehicle to which the air-cooled battery for a vehicle including the extension duct is applied, FIG. 8 is a view illustrating one end of the cooling duct on which a connector is provided, FIG. 9 is a view illustrating the connection between the cooling duct and the extension duct, and FIG. 10 is a side view of an interior of a vehicle to which the air-cooled battery for a vehicle is applied.

FIG. 1 is a side view showing an example of an interior of a hybrid electric vehicle in related art. A hybrid electric vehicle is a vehicle that may be equipped with one or more of an internal combustion engine, a battery, and a motor inside the vehicle to drive the vehicle with two energy sources.

In some examples, the motor may assist the internal combustion engine or may be independently operated to drive the vehicle in a situation in which high power may not be used. A main driving source of the hybrid electric vehicle is the internal combustion engine, and when high power is used, the vehicle may be driven by the internal combustion engine, and the battery may assist the driving of the vehicle by operating the motor.

Since the main driving source of the hybrid electric vehicle is the internal combustion engine and the battery plays a relatively assist role, the battery mounted in the hybrid electric vehicle has a smaller capacity and size than a battery mounted in electric vehicles.

Therefore, in some cases, a battery cooling system mounted in the hybrid electric vehicle also adopts an air-cooled type having a simpler structure than a water-cooled type. In an air-cooled cooling structure, as illustrated in FIG. 1, air cooling the battery is discharged to an interior space, and the air cooling the battery is directly discharged to a passenger at the rear of a seat under the seat, and thus the passenger may feel uncomfortable due to the heat of the air cooling the battery, thereby degrading the marketability of the hybrid electric vehicle.

The present disclosure is directed to minimizing discomfort that may be felt by passengers by changing a discharge path of the air cooling the battery, which is discharged to the interior space, according to the cooling of the conventional air-cooled battery in the hybrid electric vehicle.

An air-cooled battery for a vehicle according to the present disclosure for achieving the objects includes a battery mounted on a floor of the vehicle and cooled by inhaled air, and a cooling duct 100 of which one end is connected to the battery to extend in a longitudinal direction of the vehicle and the other end is branched in a width direction of the vehicle under a seat to discharge the air cooling the battery in both directions.

FIG. 2 is a view illustrating a cooling duct of an air-cooled battery for a vehicle.

In some implementations, the battery can be mounted on the floor positioned under the vehicle. The battery may be positioned at the rear side or front side of the floor of the vehicle and positioned at the center of the floor. In the present disclosure, for convenience of description, it will be described as an example that the battery is mounted on the front side of the floor.

Air for cooling the battery may be introduced from the outside of the vehicle or introduced from an interior space of the vehicle. The air introduced to cool the battery passes through the battery to cool the battery, and then is discharged to the interior space of the vehicle through the cooling duct 100.

Specifically, one end of the cooling duct 100 is connected to the battery so that the air cooling the battery is introduced, and the other end formed by extending one end of the cooling duct 100 in a longitudinal direction of the vehicle is positioned under a seat. The other end of the cooling duct 100 is branched in a width direction of the vehicle under the seat.

In other words, the other end of the cooling duct 100 may be branched in both directions to induce the air cooling the battery to be discharged in both directions under the seat, thereby preventing the air from being directly discharged to passengers.

In some implementations, where the battery is positioned at the front side of the floor of the vehicle, the cooling duct 100 may be connected to the battery and extend to the rear side of the vehicle. In some implementations, where the battery is positioned at the rear side of the floor of the vehicle, the cooling duct 100 may extend to the front side of the vehicle.

In some implementations, FIG. 4 is a view illustrating a lower surface of the cooling duct of the air-cooled battery for a vehicle.

Referring to FIGS. 2 to 5, an outlet 130 for discharging the air cooling the battery is provided at the other end of the cooling duct 100. Specifically, the other end of the cooling duct 100 is branched in the width direction of the vehicle, and the outlets 130 are provided at both ends branched by extending in the width direction.

The cooling duct 100 is disposed to be positioned under the seat, and more specifically, the other end of the cooling duct 100 and the outlets 130 provided at the other end of the cooling duct 100 are disposed to be positioned under the seat.

The seat is coupled to a seat rail 300. The seat rails 300 are also provided on the floor of the vehicle, and structurally, the seat rails 300 may be provided on the floor of the vehicle to be spaced apart from each other to form a space therebetween.

In some implementations, the other end of the cooling duct is positioned in the separated space between the seat rail 300 and the seat rail 300. Therefore, the outlet 130 of the cooling duct 100 may be disposed in a shape facing the seat rail 300.

The air discharged from the outlets 130 are discharged toward the seat rails 300, and since the discharged air is discharged toward the seat rails 300, the air cooling the battery is not directly discharged to the passengers, and thus it is possible to minimize discomfort felt by the passengers, thereby increasing the marketability of the vehicle.

In some implementations, the air discharged from the outlets 130 may be distributed to the surroundings by hitting the seat rails 300, and the distributed air may move to the passengers. In order to suppress the air hitting the seat rails 300 from being distributed to move to the passengers, a guide grille 150 may be provided at the outlet 130.

The guide grille 150 provided at the outlet 130 may extend toward the facing seat rail 300, and the guide grille 150 may be formed in a streamlined shape in which as the guide grille 150 extends, an upper end thereof is close to the seat rail 300. The guide grille 150 is provided to be close to the seat rail 300 and is formed in the streamlined shape in which the upper end is formed to be closer to the guide grille 150 than a lower end is so that the air cooling the battery may be stably discharged to the seat rail 300 side.

In addition, a wire 500 through which an electrical signal or electric energy moves may be disposed between the seat rail 300 and the outlet 130 of the cooling duct 100, and there is an advantage in that the guide grille has a structure suitable for designing the floor of the vehicle because it may be formed to avoid the wire 500 to consider the arrangement of component of the vehicle.

In addition, referring to FIG. 5, a protector 350 extending in a direction toward the cooling duct 100 may be formed at the upper end of the seat rail 300. A portion of the upper end of the seat rail 300, which faces the cooling duct 100, may extend in a direction toward the cooling duct 100 to form an eaves structure.

Therefore, it is possible to suppress the air discharged from the outlets 130 from moving up after hitting the seat rails 300.

In other words, the guide grille 150 may be formed at the outlet 130 in a direction toward the seat rail 300, and the protector 350 may be formed at the upper end of the seat rail 300 in a direction toward the outlet 130. As described above, there is an advantage in that it is possible to prevent the air discharged from the outlets 130 from being distributed upward by forming the eaves structure on the outlet 130 and the seat rail 300, thereby minimizing discomfort that may be felt by passengers.

In addition, due to the eaves structure formed at both sides of the seat rail 300 and the outlet 130, it is possible to suppress external foreign substances from being introduced from above.

In some implementations, referring to FIG. 4, a plurality of holes 330 through which the air cooling the battery, which is discharged from the outlets 130, is introduced may be formed in the seat rails 300. The plurality of holes 330 may be formed in a side surface of the seat rail 300, specifically, the side surface of the seat rail 300 facing the outlet 130. The air discharged from the outlet 130 may flow into the seat rail 300 through the holes 330 formed in the seat rail 300, and the air flowing into the seat rail 300 may be uniformly distributed to the interior of the vehicle by moving along the seat rail 300.

Therefore, there is an advantage in that by preventing the air cooling the battery from being directly discharged to passengers and allowing the discharged air to be uniformly distributed to the interior space, it is possible to minimize discomfort that may be felt by the passengers.

In some implementations, the upper end of the outlet 130 may be disposed to be positioned under the upper end of the seat rail 300. By positioning the upper end of the outlet 130 or an end portion of the guide grille 150 provided at the outlet 130 under the upper end of the seat rail 300, it is possible to suppress the discharged air from being distributed upward, and by forming the guide grille 150 and the protector 350 to partially overlap each other by positioning the end portion of the guide grille 150 on a lower end of the protector 350 formed on the seat rail 300, it is possible to suppress the discharged air from being distributed upward and external foreign substances from being introduced from above.

Although the upper end of the outlet 130 may be positioned above the upper end of the seat rail 300, in order for the air discharged from the outlet 130 to stably flow into the seat rail 300, the upper end of the seat rail 300 can be positioned above the upper end of the outlet 130.

In some implementations, an extension duct 700 of which one end is connected to the battery and the other end is connected to the cooling duct 100 may be further included between the battery and the cooling duct 100. When only the battery and the cooling duct 100 are connected, the other end of the cooling duct 100 may be positioned under a first row seat to discharge air to the seat rail 300 side of the first row seat.

However, since passengers are frequently positioned in the first row seat or a second row seat, the extension duct 700 may be provided between the cooling duct 100 and the battery to extend the cooling duct 100 to a third row or rows behind the third row.

FIG. 6 is a view illustrating an extension duct of the air-cooled battery for a vehicle, and FIG. 7 is a view illustrating a floor of a vehicle to which the air-cooled battery for a vehicle including the extension duct is applied.

In FIG. 7, it can be confirmed that the battery is mounted on a floor at the first row seat side, and the extension duct 700 is further included between the battery and the cooling duct 100 so that the air cooling the battery is discharged under the second row seat.

The extension duct 700 may be formed longer or the cooling duct 100 may be formed longer so that air is discharged under the third row seat of the vehicle.

In some implementations, when the extension duct 700 is further provided between the battery and the cooling duct 100, the one end of the extension duct 700 may be connected to the battery and the other end of the extension duct 700 may be connected to the cooling duct 100.

In this case, a connector 900 for connecting the other end of the cooling duct 100 to the cooling duct may be provided at the one end of the cooling duct 100. FIG. 8 is a view illustrating one end of the cooling duct on which a connector is provided. As illustrated in FIG. 8, the connector 900 may be coupled to the cooling duct 100 in a shape surrounding the one end of the cooling duct.

The cooling duct 100 is generally made of a plastic material and molded by a blowing method. At this time, heat shrinkage occurs in a process of cooling the heated and molded plastic and thus one end portion of the cooling duct 100 shrinks inward, thereby destabilizing the flow of air.

As described above, the connector 900 may be provided to expand the one end of the heat-shrunk cooling duct 100 and connect the other end of the extension duct 700 to the one end of the cooling duct 100.

In this case, in order to stably expand the one end of the cooling duct 100, as illustrated in FIG. 9, the other end of the extension duct 700 can be inserted into the one end of the cooling duct 100 to connect the extension duct 700 to the cooling duct 100.

Referring to FIG. 9, the one end of the cooling duct 100 may be formed in an oblique shape in which an upper end protrudes more than a lower end, and thus the other end of the extension duct 700 may be inserted into the cooling duct 100 in a direction from an upper side to a lower side of the cooling duct 100 to connect the cooling duct 100 to the extension duct 700.

In some implementations, each end portion at which the cooling duct 100 and the extension duct 700 are connected may be disposed in a lower space between the seats. As illustrated in FIG. 10, a passenger's feet is positioned in the space between the seats, and by introducing the extension duct 700, a carpet provided on the upper portion of the floor may be indented into the floor by the passenger's feet.

Since the portions at which the cooling duct 100 and the extension duct 700 are connected have sufficient rigidity to support a load of the passenger's feet, each end portion at which the cooling duct 100 and the extension duct 700 are connected can be disposed in the lower space between the seats.

When the portions at which the cooling duct 100, the extension duct 700, and the connector 900 provided between the cooling duct 100 and the extension duct 700 are positioned are disposed in the lower space between the seats, it is possible to sufficiently secure rigidity by the cooling duct 100, the extension duct 700, and the connector 900, thereby suppressing the carpet of the floor from being indented into the floor due to the load of the passenger's feet.

Although the specific exemplary implementations of the present disclosure have been illustrated and described, it will be apparent to those skilled in the art that the present disclosure may be variously improved and changed without departing from the technical spirit of the present disclosure provided by the appended claims.

What is claimed is:

1. An air-cooled battery for a vehicle, the air-cooled battery comprising:

a battery configured to be mounted on a floor of the vehicle and to be cooled by air;

a cooling duct having (i) a first portion that extends in a longitudinal direction of the vehicle to be connected to the battery and (ii) a second portion that is branched from the first portion in a width direction of the vehicle, the second portion being configured to be disposed below a seat of the vehicle and to discharge air cooling the battery in a plurality of directions, wherein the second portion of the cooling duct defines an outlet configured to discharge the air cooling the battery, and the outlet is defined at a side of the cooling duct and configured to face a seat rail of the vehicle, the seat being coupled to the seat rail; and a guide grille disposed at an outside of the outlet and configured to guide air discharged from the second portion in a direction toward the seat rail, the guide grille defining a streamlined shape that is configured to extend toward the seat rail and having an upper end disposed adjacent to the seat rail, wherein the guide grille defines one or more openings configured to discharge the air that is discharged from the outlet.

2. The air-cooled battery according to claim 1, wherein the cooling duct is configured to face a protector of the vehicle that is disposed at an upper end of the seat rail and extends in a direction toward the cooling duct.

3. The air-cooled battery according to claim 1, wherein the outlet is configured to face a plurality of holes that are defined at a side surface of the seat rail facing the outlet and configured to receive the air discharged from the outlet.

4. The air-cooled battery according to claim 1, wherein an upper end of the outlet is configured to be disposed below an upper end of the seat rail.

5. The air-cooled battery according to claim 1, further comprising an extension duct disposed between the battery and the cooling duct, the extension duct having (i) a first end connected to the battery and (ii) a second end connected to the cooling duct.

6. The air-cooled battery according to claim 5, further comprising a connector that is disposed at and surrounds the first portion of the cooling duct, the connector connecting the first portion of the cooling duct to the second end of the extension duct.

7. The air-cooled battery according to claim 6, wherein the second end of the extension duct is connected to an inner side of the connector.

8. The air-cooled battery according to claim 5, wherein an end of the cooling duct is connected to the second end of the extension duct, and the cooling duct and the extension duct are configured to be disposed in a lower space defined between a plurality of seats of the vehicle.

9. The air-cooled battery according to claim 1, wherein the outlet is configured to be positioned under a first row seat or a second row seat of the vehicle.

10. The air-cooled battery according to claim 5, wherein the outlet is configured to be positioned under a second row seat or a third row seat of the vehicle.

11. The air-cooled battery according to claim 5, wherein the first portion of the cooling duct has an oblique shape, and an upper end of the first portion protrudes relative to a lower end of the first portion.

12. The air-cooled battery according to claim 1, wherein the plurality of directions comprise a pair of directions that are oriented opposite to each other in the width direction of the vehicle.

13. The air-cooled battery according to claim 1, wherein the second portion of the cooling duct comprises:

a first outlet that protrudes from a first side surface of the cooling duct and extends in a first direction along the width direction of the vehicle; and a second outlet that protrudes from a second side surface of the cooling duct opposite to the first side surface, the second outlet extending in a second direction opposite to the first direction along the width direction of the vehicle.

14. The air-cooled battery according to claim 1, wherein the seat rail is one of a first seat rail or a second seat rail of the vehicle, and wherein the cooling duct defines (i) a first outlet configured to face the first seat rail and (ii) a second outlet configured to face the second seat rail, the outlet of the cooling duct being the first outlet or the second outlet.

15. The air-cooled battery according to claim 1, wherein the guide grille is disposed downstream relative to the outlet and configured to be disposed between the outlet and the seat rail.

* * * * *